US008819065B2

(12) United States Patent
Dong et al.

(10) Patent No.: US 8,819,065 B2
(45) Date of Patent: Aug. 26, 2014

(54) MINING GENERALIZED SPATIAL ASSOCIATION RULE

(75) Inventors: Wei Shan Dong, Beijing (CN); Arun Hampapur, Norwalk, CT (US); Zhong Bo Jiang, Beijing (CN); Hongfei Li, Yorktown Heights, NY (US); Xuan Liu, Yorktown Heights, NY (US); Wei Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 13/179,125

(22) Filed: Jul. 8, 2011

(65) Prior Publication Data

US 2013/0013640 A1    Jan. 10, 2013

(51) Int. Cl.
*G06F 7/00* (2006.01)
*G06F 17/30* (2006.01)

(52) U.S. Cl.
USPC .......................................... 707/778; 707/921

(58) Field of Classification Search
USPC .................. 707/777, 778, 918, 919, 921, 943
See application file for complete search history.

(56) References Cited

U.S. PATENT DOCUMENTS

| | | | |
|---|---|---|---|
| 6,754,651 B2 * | 6/2004 | Nanavati et al. | 707/694 |
| 6,941,303 B2 * | 9/2005 | Perrizo | 1/1 |
| 2001/0051947 A1 * | 12/2001 | Morimoto et al. | 707/100 |
| 2008/0010259 A1 * | 1/2008 | Feng et al. | 707/3 |
| 2010/0332430 A1 * | 12/2010 | Caraviello et al. | 706/13 |

OTHER PUBLICATIONS

Koperski. A progressive refinement approach to spatial data mining. Doctoral dissertation. Simon Fraser University, 1999.*
Stefanovic et al. "Object-Based Selective Materialization for Efficient Implementation of Spatial Data Cubes". 2000. IEEE Transactions on Knowledge and Data Engineering. vol. 12, No. 6. pp. 938-958.*
Han et al. "GeoMiner: A System Prototype for Spatial Data Mining". In Proceedings of the 1997 ACM SIGMOD international conference on Management of data (SIGMOD '97). ACM, New York, NY, USA, pp. 553-556.*
Han et al. Dynamic Generation and Refinement of Concept Hierarchies for Knowledge Discovery in Databases. 1994. In Proc. AAA'94 Workshop on Knowledge Disccovery in Databases (KDD'94), Seattle WA, pp. 157-168.*
Fonseca et al. Semantic granularity in ontology-driven geographic information systems. Annals of Mathematics and Artificial Intelligence. Sep. 2002. vol. 36, Issue 1-2, pp. 121-151.*

(Continued)

*Primary Examiner* — James E Richardson
(74) *Attorney, Agent, or Firm* — Scully, Scott, Murphy & Presser, P.C.; Daniel P. Morris, Esq.

(57) ABSTRACT

A system, method and computer program product for mining a rule including spatial information and non-spatial information by using a SAR (Spatial Association Rule) mining tool. The computing system is configured to construct an expanded spatial predicate transaction table for reference spatial objects and a generalized taxonomy for task-relevant spatial objects. The computing system is configured to run the SAR mining tool with the constructed expanded spatial predicate transaction and the generalized taxonomy. The computing system outputs, from the SAR mining tool, a set of generalized spatial association rules for the reference spatial objects. The generalized spatial association rule includes the spatial information and non-spatial information, associated with both the reference spatial objects and the task-relevant spatial objects.

18 Claims, 16 Drawing Sheets

(56) References Cited

OTHER PUBLICATIONS

Jones et al. Maintaining Ontologies for Geographical Information Retrieval on the Web. 2003. On the Move to Meaningful Internet Systems 2003: CoopIS, DOA, and ODBASE Lecture Notes in Computer Science. vol. 2888. pp. 934-951.*

Fu et al. Building a Geographical Ontology for Intelligent Spatial Search on the Web. 2005. In Proceedings of IASTED International Conference on Databases and Applications. 6 pages.*

Chen, J., "An Algorithm About Association Rule Mining Based on Spatial Autocorrelation", The International Archives of the Photogrammetry, Remote Sensing and Spatial Information Sciences, ISPRS Congress Beijing 2008, vol. 37, Part B6b, Youth Forum.

Han, J., et al., "Discovery of Multiple-Level Association Rules from Large Databases", Proceeding VLDB '95 Proceedings of the 21th International Conference on Very Large Data Bases, Sep. 1995, Morgan Kaufmann Publishers Inc. San Francisco, CA.

Han, J., et al., "Mining Frequent Patterns without Candidate Generation: A Frequent-Pattern Tree Approach", Data Mining and Knowledge Discovery, Jan. 2004, 8, pp. 53-87, Kluwer Academic Publishers, Manufactured in the Netherlands.

Koperski, K., et al., "Discovery of Spatial Association Rules in Geographic Information Databases", Proceeding SSD '95 Proceedings of the 4th International Symposium on Advances in Spatial Databases, Aug. 6-9, 1995, Springer-Verlag London, UK.

Lee, A. J.T., et al., "Mining spatial association rules in image databases", Journal Information Sciences: an International Journal archive, Apr. 2007, vol. 177, Issue 7, pp. 1593-1608.

Lee, C-F., et al., "Adaptive Two-Phase Spatial Association Rules Mining Method", JCS&T, Apr. 2006, vol. 6, No. 1.

Srikant, R., et al., "Mining Generalized Association Rules" Journal Future Generation Computer Systems—Special double issue on data mining archive, Nov. 1997, vol. 13, Issue 2-3, Elsevier Science Publishers, B. V. Amsterdam, The Netherlands, The Netherlands.

Zaki, M. J., "Scalable Algorithms for Association Mining", IEEE Transactions on Knowledge and Data Engineering, May/Jun. 2000, vol. 12, No. 3.

Zhao, Q., et al., "Association Rule Mining: A Survey", Technical Report, CAIS, Nanyang Technological University, Singapore, No. 2003116, 2003.

Agrawal, R., et al., "Fast Algorithms for Mining Association Rules", Proceedings of the 20th VLDB Conference Santiago, Chile, 1994.

* cited by examiner

Spatial Objects in A Spatial Database

| Town | Water | Road | Boundary | Mine |
|---|---|---|---|---|
| Victoria | Juan_de_Fuca_Strait | highway_1, highway_17 | US | |
| Saanich | Juan_de_Fuca_Strait | highway_1, highway_17 | US | |
| Prince_George | | highway_97 | | |
| Pentincton | Okanagan_Lake | highway_97 | US | Alalla |
| ... | | | | ... |

Reference Obj     Task-relevant Obj

— 205 / — 210

Spatial Predicate Transactions, 200

| Town | Water | Road | Boundary |
|---|---|---|---|
| Victoria | {adjacent_to, J.de_Fuca_Strait} | {intersects, highway_1}, {intersects, highway_17} | {close_to, US} |
| Saanich | {adjacent_to, J.de_Fuca_Strait} | {intersects, highway_1}, {intersects, highway_17} | {close_to, US} |
| Prince_George | | {intersects, highway_97} | |
| Pentincton | {adjacent_to, Okanagan_Lake} | {intersects, highway_97} | {close_to, US} |
| ... | | | ... |

400 — Reference obj (non-spatial) attribute table: Table *Town*

| ID | Area | Population |
|---|---|---|
| Victoria | | |
| Saanich | | |

405 — Expanded Spatial Predicate Transaction Table

| Town | Water | Road | Boundary | Area | Population |
|---|---|---|---|---|---|
| Victoria | {adjacent_to, J.de_Fuca_Strait} | {intersects, highway_1}, {intersects, highway_17} | {close_to, US} | | |
| Saanich | {adjacent_to, J.de_Fuca_Strait} | {intersects, highway_1}, {intersects, highway_17} | {close_to, US} | | |
| Prince_George | | | | | |
| Pentincton | {adjacent_to, Okanagan_Lake} | {intersects, highway_97} | {close_to, US} | | |
| ... | | ... | | | |

Non-spatial attribute expansion

Mined Generalized Spatial Association Rules

- Some typical generalized rule output
  using *min_supp* = 10% & *min_conf* = 80%:

1. {OFFGEN=Drugs} => {Close_to, Road} ⎯⎯ 1000
     (31%, 80.8%)

2. {DAY=Saturday} {Within, Low Pop
     Density} => {OFFGEN=Vehicle Theft} ⎯⎯ 1005
     (13%, 82.2%)

3. {Within, 18} {Close_to, Road} =>
     {OFFGEN=Vehicle Theft} ⎯⎯ 1010
     (11%, 81.8%)

FIG. 10

| ID | OFFGEN | BEGINDATE | ENDDATE | LOCATION | DAY |
|---|---|---|---|---|---|
| 1246 | Drugs | 2009-1-8 | 2009-1-8 | BLOCK OF N FREYA ST | Wednesday |
| 3479 | Drugs | 2009-1-10 | 2009-1-10 | 4100 BLOCK OF N REGAL ST | Friday |
| 749 | Drugs | 2009-1-31 | 2009-1-31 | 3000 BLOCK OF E MARSHALL AV | Friday |
| 1366 | Drugs | 2009-1-31 | 2009-1-31 | BLOCK OF E GRACE AV | Friday |
| 1981 | Vehicle Theft | 2009-1-21 | 2009-1-21 | BLOCK OF E DALKE AV | Tuesday |
| 3167 | Vehicle Theft | 2009-1-23 | 2009-1-23 | 3000 BLOCK OF E CENTRAL AV | Thursday |
| 1954 | Vehicle Theft | 2009-1-9 | 2009-1-9 | 2600BLOCK OF N ALTAMONT ST | Thursday |
| 705 | Robbery | 2009-3-1 | 2009-3-1 | BLOCK OF E ILLINOIS AV | Sunday |
| 1015 | Robbery | 2009-1-22 | 2009-1-22 | BLOCK OF E MISSION AV | Wednesday |

FIG. 11

| Town | Water | Road | Boundary | ... | Length | Load | Length | Load |
|---|---|---|---|---|---|---|---|---|
| Victoria | {adjacent_to, J.de_Fuca_Strait} | {intersects, highway_1}, {intersects, highway_17} | {close_to, US} | | | | | |
| Saanich | {adjacent_to, J.de_Fuca_Strait} | {intersects, highway_1}, {intersects, highway_17} | {close_to, US} | | Non-spatial attributes of highway_1 | | Non-spatial attributes of highway_17 | |
| Prince_George | | {intersects, highway_97} | | | | | | |
| Pentincton | {adjacent_to, Okanagan_Lake} | {intersects, highway_97} | {close_to, US} | | | | | |
| ... | | | ... | Non-spatial attributes of reference obj | | | | |

MINING GENERALIZED SPATIAL ASSOCIATION RULE

BACKGROUND

The present application generally relates to data mining. More particularly, the present application relates to mining a generalized spatial association rule using data mining software.

Spatial association rule (SAR) mining finds rules describing frequent patterns of spatial relationships between spatial objects. Krzysztof Koperski and Jiawei Han, "Discovery of Spatial Association Rules in Geographic Information Databases," Proceedings of the 4th International Symposium on Advances in Spatial Databases SSD '95, wholly incorporated by reference as if set forth herein, hereinafter "Koperski," describes a standard SAR mining algorithm in detail. A spatial relationship is defined between a reference spatial object and a task-relevant spatial object, and is represented by a spatial predicate describing spatial information of the reference spatial object. The standard SAR mining algorithm can also be extended by adding a taxonomy handler to mine rules with concepts of spatial objects. However, the standard SAR mining algorithm can only discover rules that associate the spatial information (e.g., adjacency, etc.) of reference spatial objects. The discovered rules through the standard SAR mining algorithm cannot include non-spatial information (e.g., demographic information, etc.) of either reference or task-relevant spatial objects in generated rules.

FIG. 1 illustrates traditional ways of creating generalized rules (e.g., inferences, etc.) that associates two or more items, e.g., shirt, jacket, hiking boots, etc, and/or their taxonomies (i.e., concept classifications). There is provided a table 100 that stores prior transactions of purchased items, e.g., shirt, jacket, hiking boots, etc. There is provided a taxonomy 105 of each item involved in the prior transactions. A traditional rule miner with a taxonomy handler for creating generalized association rules expands the table 100 by using the taxonomy 105. Srikant, et al. "Mining Generalized Association Rules," Proceeding of the 21$^{st}$ VLDB Conference, Zurich, Switzerland, 1995, wholly incorporated by reference as if set forth herein, hereinafter "Srikant," describes a traditional rule miner with a taxonomy hander. Han, et al., "Discovery of Multiple-Level Association Rules from Large Databases," Proceedings of the 21$^{st}$ VLDB Conference, Zurich, Switzerland, 1995, wholly incorporated by reference as if set forth herein, hereinafter "Han," describes another traditional rule miner with a taxonomy handler. For example, as shown in an expanded table 110, the transaction 200 is expanded to include "outerwears" and "clothes" which are more generic classes of "jacket." The transaction 200 is further expanded to include "footwear" which is a higher class of "hiking boots." Based on the expanded table 110, the traditional rule miner creates a table 115. For example, since "Jacket" appears twice in the expanded table 110, the corresponding support value of the "Jacket" in table 115 is two. Based on the table 115, the traditional rule miner creates generalized association rules (e.g., outerwear→hiking boots). Thus, the traditional rule miner may infer that there is a correlation between the "outerwear" and "hiking boots." For example, the rule "outerwear→hiking boots" has 33% support value and 66.6% confidence value. The support value of the generalized association rule (e.g., outerwear→hiking boots) is the percentage of the transactions that include both outerwear and hiking boots. The confidence value of the generalized association rule refers that 66.6% of customers who purchase outerwear also purchase hiking boots.

However, the traditional rule miner without taxonomy handler cannot generate rules that associate concepts with items, e.g., "outerwear" and "hiking boots." The rules generated from the traditional rule miner do not include other information, for example, price, place of the purchase, etc.

SUMMARY OF THE INVENTION

The present disclosure describes a system, method and computer program product for mining a rule including spatial information and non-spatial information by using a SAR (Spatial Association Rule) mining tool.

In one embodiment, there is provided a system for mining a rule including spatial information and non-spatial information by using a SAR (Spatial Association Rule) mining tool. The system comprises a computing system including at least one memory device and at least one processor connected to the memory device. The computing system is configured to construct an expanded spatial predicate transaction table for reference spatial objects and a generalized taxonomy for task-relevant spatial objects. The expanded spatial predicate transaction table includes spatial predicates of the reference spatial objects and non-spatial information associated with the reference spatial objects. The generalized taxonomy includes non-spatial information and a concept classification (i.e., taxonomy) associated with the task-relevant spatial objects. The computing system is configured to run the SAR mining tool with the constructed expanded spatial predicate transaction table and the generalized taxonomy. The computing system generates, by the SAR mining tool, a set of generalized spatial association rules for the reference spatial objects. The generalized spatial association rule includes the spatial information and non-spatial information, associated with both the reference spatial objects and the task-relevant spatial objects.

In a further embodiment, the generalized taxonomy for the task-relevant spatial objects includes: the concept classification of the task-relevant spatial objects, and a mapping between the task-relevant spatial objects and non-spatial attributes representing the non-spatial information associated with the task-relevant spatial objects.

In a further embodiment, to construct the generalized taxonomy, the computing system is further configured to create or read a table that associates the non-spatial attributes and the task-relevant spatial objects. The computing system is configured to represent the concept classification of the task-relevant spatial objects as a data structure. The computing system is configured to generate the mapping from the table. The generated mapping associates the non-spatial attributes and the task-relevant spatial object by using the same data structure.

In a further embodiment, the concept classification of the task-relevant spatial objects represents a membership relationship between the task-relevant spatial objects and a general class of the task-relevant spatial objects. The task-relevant spatial objects are specific objects belonging to the general class. The general class is an abstraction of the task-relevant spatial objects.

In a further embodiment, the generalized spatial association rule includes at least one spatial predicate of the reference spatial objects, the non-spatial information of the reference spatial objects and the task-relevant spatial objects, and the concept classification of the task-relevant spatial objects.

In a further embodiment, the at least one spatial predicate of a reference spatial object includes: a task-relevant spatial object or a concept of the task-relevant spatial objects and at least one spatial relationship between the reference spatial object and the task-relevant spatial object or the concept of the task-relevant spatial objects.

In a further embodiment, the at least one spatial relationship includes one or more of: a topological relationship, a metrical relationship, and a directional relationship, the topological relationship including one of: an intersection, an adjacency, and an inclusion, the metrical relationship including one of: a distance, an area, and a closeness, the directional relationship including one of: above, behind, north, west, east, south, northeast, southwest, northwest, and southeast.

In a further embodiment, the non-spatial information of the reference spatial objects and the task-relevant spatial objects includes one or more of: demographic information, temporal or seasonal information, event information, accident information, financial information, disease information, and crime information.

In a further embodiment, the generalized spatial association rule represents associations and correlations among the spatial predicates of the reference spatial objects and the non-spatial information of all the reference and task-relevant spatial objects.

In a further embodiment, the SAR mining tool supports running the constructed generalized taxonomy.

BRIEF DESCRIPTION OF THE DRAWINGS

The accompanying drawings are included to provide a further understanding of the present invention, and are incorporated in and constitute a part of this specification.

FIG. 2 illustrates exemplary reference spatial objects, task-relevant spatial objects and spatial predicate transactions in one embodiment.

FIG. 4 illustrates an expanded spatial predicate transaction table in one embodiment.

FIG. 10 illustrates exemplary generalized spatial association rules in one embodiment.

FIG. 11 illustrates an exemplary non-spatial information of reference spatial objects in one embodiment.

FIG. 13 illustrates adding non-spatial information of task-relevant objects to an expanded spatial predicate transaction table in an alternative embodiment.

DETAILED DESCRIPTION

A reference spatial object (e.g., reference spatial objects 205 shown in FIG. 2) refers to a target or goal of rule mining, which is a main subject of mining of spatial association rules. If a user is interested in finding spatial association rules between towns and other "near by" objects including mines, country boundary and water, then the towns are reference spatial objects, and mines, country boundary and water are task-relevant spatial objects. Examples of the reference spatial object include, but are not limited to: towns, crime incidents, accident incidents, disease cases, etc. For example, FIG. 2 lists towns (e.g., Victoria, Saanich, etc.) as reference spatial objects. In this example, a user is interested in finding spatial association rules between towns, the target of the rule mining, and other "near by" objects. A task-relevant object (e.g., task-relevant spatial objects 210 shown in FIG. 2) refers to an external factor that may influence an occurrence of the reference spatial object and may be relevant to the rule mining. For example, FIG. 2 illustrates specific rivers and lakes, specific roads, and specific boundary as task-relevant spatial objects. A rule mining refers to building a spatial predicate transaction table (e.g., a spatial predicate transaction table 200 shown in FIG. 2) for the reference spatial object and then mining association rules from the spatial predicate transaction table. In one embodiment, a computing system (e.g., a computing system 900 shown in FIG. 9) creates the spatial predicate transaction table, e.g., by associating the reference spatial objects and the task-relevant spatial objects based on an electronic map (e.g., Google® Map, etc.) or a geographic information system (GIS) (e.g., ArcGIS®, etc.) that illustrates and computes spatial relationships between these reference spatial objects and the task-relevant spatial objects. Then the computing system mines association rules from the special predicate transaction table, e.g., by running association rule mining algorithms (e.g., Koperski, Han, etc.). A spatial predicate includes, but is not limited to: a task-relevant spatial object or a concept of the task-relevant spatial objects, and at least one spatial relationship between a reference spatial object and that task-relevant spatial object or the concept of task-relevant spatial objects. A spatial relationship includes, but is not limited to: topological relationship, metrical relationship, directional relationship, etc. A topological relationship includes, but is not limited to: an intersection, an adjacency, an inclusion, etc. A metrical relationship includes, but is not limited to: a distance, an area, a closeness, etc. A directional relationship includes, but is not limited to: above, behind, below, North, South, East, West, Northeast, Southeast, etc.

Figure 7:
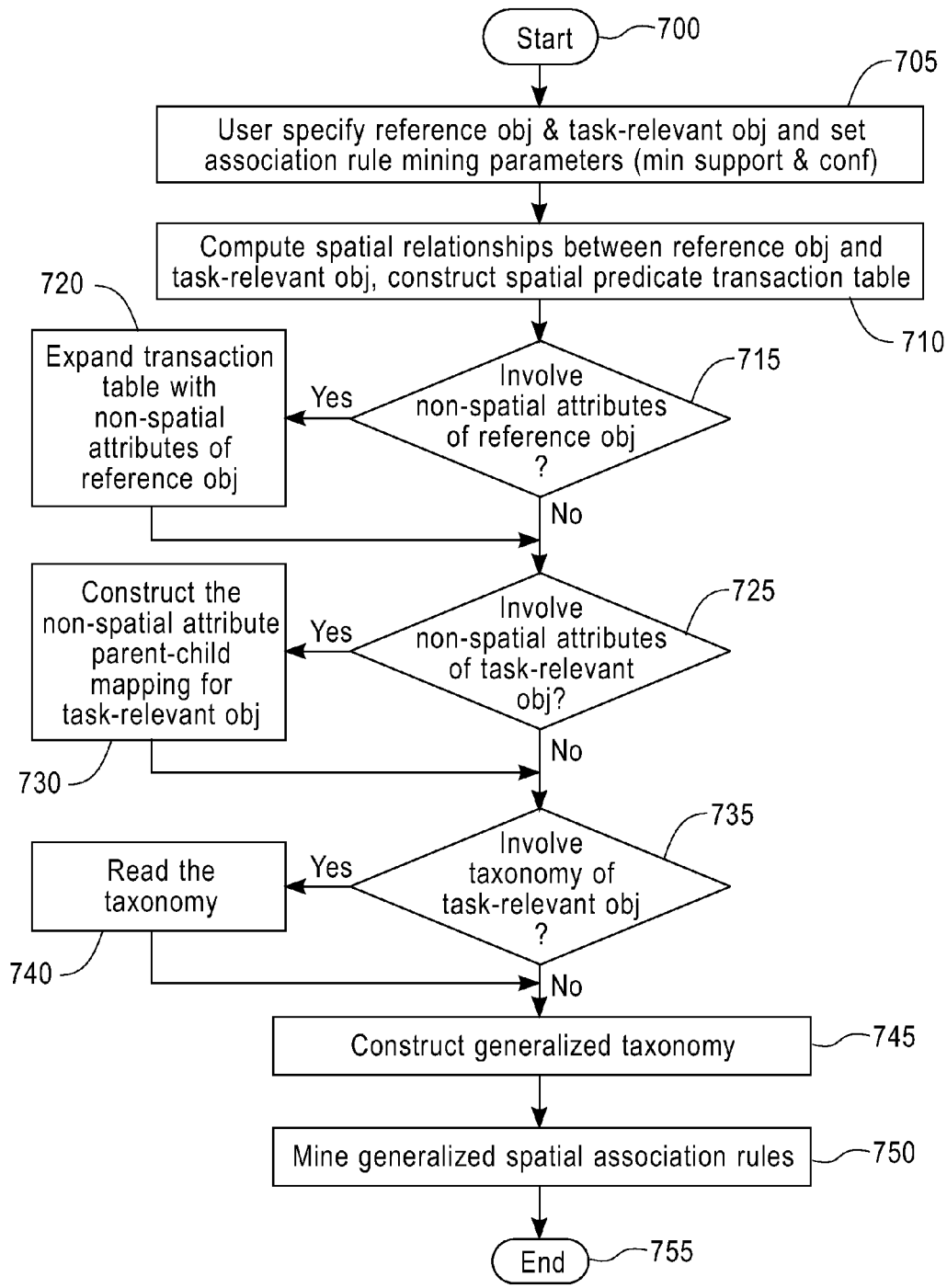
FIG. 7 illustrates method steps for mining a rule including spatial information and non-spatial information by using a SAR mining tool in one embodiment.
Figure 8:
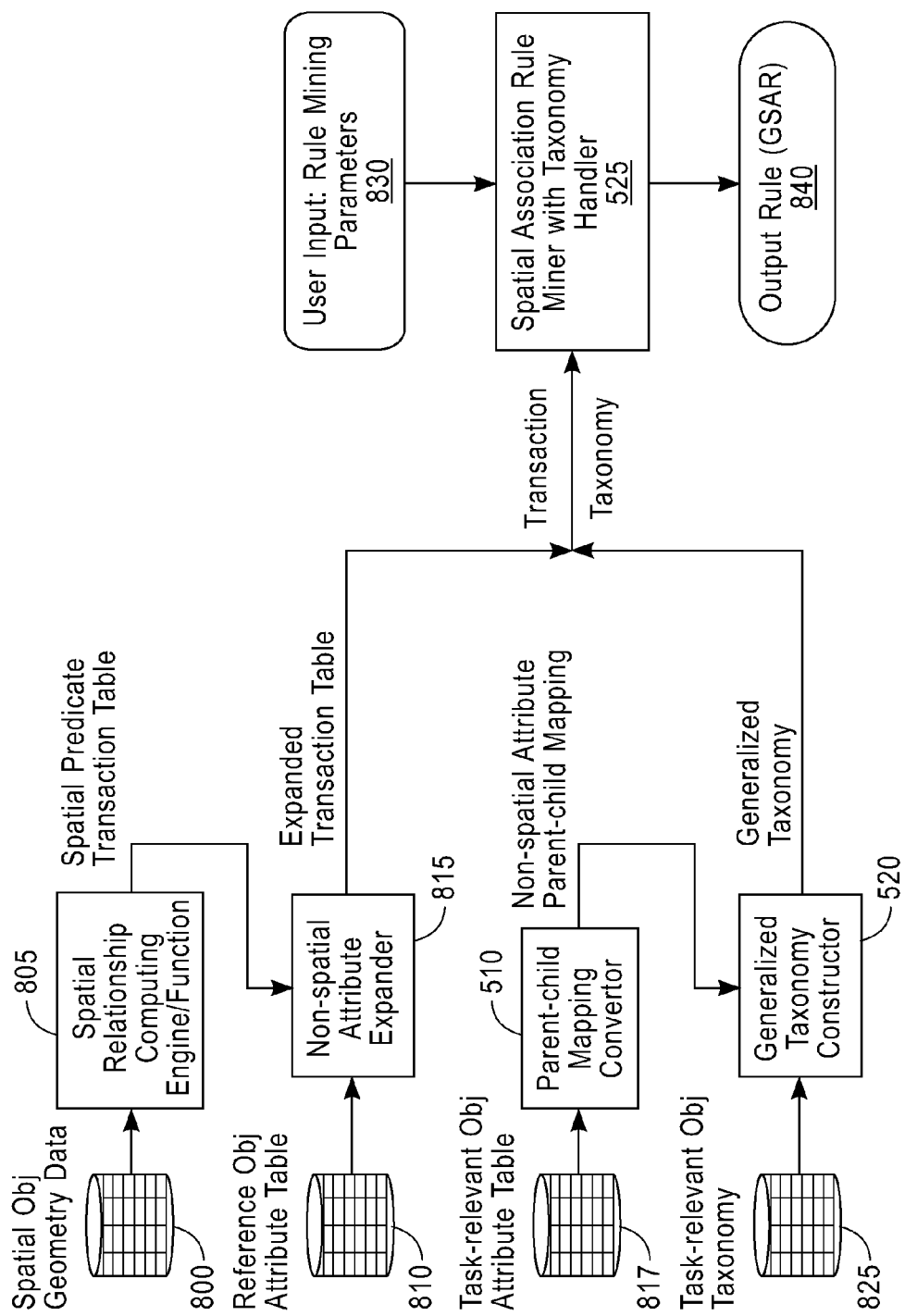
FIG. 8 illustrates a system diagram for mining a rule including spatial information and non-spatial information by using a SAR mining tool in one exemplary embodiment.

FIG. 7 is a flow chart that describes method steps for mining a rule that includes spatial information and non-spatial information by using a known, unmodified SAR (Spatial Association Rule) mining tool with a taxonomy handler in one embodiment. FIG. 8 illustrates a corresponding system diagram for mining a rule that includes spatial information and non-spatial information by using a known, unmodified SAR (Spatial Association Rule) mining tool with a taxonomy handler (e.g., Koperski, Han, etc.) in this embodiment. At step 700, a computing system (e.g., a computing system 900 shown in FIG. 9) starts the rule mining. At step 705, a user, through the computing system, specifies reference spatial objects and task-relevant spatial objects, and sets association rule mining parameters (e.g., parameters 830 shown in FIG.

8, minimum support value and minimum confidence value to be achieved by the mined rules, etc.). For example, the user may set that, through the computing system, the minimum support value is 10% and the minimum confidence value is 80%. Suppose that a rule represented by a form "X=>Y," where X and Y are combinations of spatial predicates and/or non-spatial attributes (non-spatial information) of reference spatial objects. The support value refers to the percentage of transactions in the expanded spatial predicate transaction table (e.g., table 405 shown in FIG. 4) that contain X and Y, i.e., the percentage of occurrences of the reference spatial objects (e.g., crime occurrences/reportings/incidents, etc.) that have spatial predicates and non-spatial attributes X and Y. The confidence value refers to the minimum percentage of transactions that have X and also have Y. The rule miner (e.g., Koperski, Han, etc.) will only generate rules whose (1) support value is above the minimum support value, and (2) confidence value is above the minimum confidence value.

Returning to step 710 in FIG. 7, the computing system computes spatial relationship between the specified reference spatial objects and the specified task-relevant spatial objects, and constructs a spatial predicate transaction table, e.g., by using a spatial relationship computing engine 805 in FIG. 8. For example, based on an electronic map of the specified reference objects, which may be stored in database 800 or available via Internet, the spatial relationship computing engine 805 may determines a spatial relationship between a reference spatial object and a task-relevant object. For example, if a town "Victoria" is adjacent to a river "Juan_de_Fuca_Strait," the spatial relationship computing engine 805 determines that the town "Victoria" is "adjacent to" to the river "Fucan_Strait." If a town "Pentincton" intersects with a highway "highway__97," the spatial relationship computing engine 805 determines that the town "Pentincton" "intersects" the "highway__97." Based on these determined spatial relationships, the spatial relationship computing engine 805 creates the spatial predicate transaction table (e.g., spatial predicate transaction table 200 shown in FIG. 2). In the spatial predicate transaction table, each cell of a task-relevant object includes its name and its spatial relationship with the reference spatial object. For example, as shown in the table 200, since the town "Victoria" is "adjacent to" "Fuca_Strait," the first row 215 describes that the town "Victoria" is "<adjacent_to, Fuca_Strait>."

Returning to FIG. 7, at step 715, the computing system evaluates whether there exists non-spatial information associated with the specified reference spatial objects, e.g., in a database 810. Non-spatial information includes, but is not limited to: demographic information, temporal or seasonal information, event information, accident information, financial information, disease information and crime information. If there exists non-spatial information associated with the specified reference spatial objects in the database 810, at step 720, the computing system expands the spatial predicate transaction table to include the non-spatial information associated with the specified reference spatial objects, e.g., by using a non-spatial attribute expander 815 in FIG. 8. Otherwise, the computing system runs step 725. FIG. 4 illustrates exemplary non-spatial information 400 and an exemplary expanded spatial predicate transaction table 405 in one embodiment. For example, the exemplary non-spatial information 400 of a town "Victoria" includes, but is not limited to: Area, Population, etc. The non-spatial attribute expander 815 expands the spatial predicate transaction table, e.g., by attaching these non-spatial information at the end of the spatial predicate transaction table. An expanded spatial predicate transaction table includes, but is not limited to: spatial predicates of the specified reference spatial objects and the non-spatial information associated with the specified reference spatial objects.

FIG. 11 illustrates another exemplary expanded spatial predicate transaction table 1115 in the context of committed crimes in one embodiment. In this table 1115, column 1105 includes crime ID numbers that represent crimes and that correspond to reference spatial objects. Columns 1100 and 1110 represent non-spatial information associated with the reference spatial objects. Column 1100 categorizes the crimes. Column 1110 specifies which day each crime occurred.

Returning to FIG. 7, at step 725, the computing system evaluates whether there exists non-spatial information associated with the specified task-relevant spatial objects, e.g., in a database 817 shown in FIG. 8. If there exists non-spatial information (or non-spatial attributes) associated with the specified task-relevant spatial objects, e.g., in the database 817, at step 730, the computing system creates or reads a non-spatial information table (e.g., table 500 shown in FIGS. 5-6), e.g., from a database 817 shown in FIG. 8, that corresponds the task-relevant objects to the non-spatial information associated with the task-relevant objects. Otherwise, the computing system runs step 735 in FIG. 7.

Figure 12:
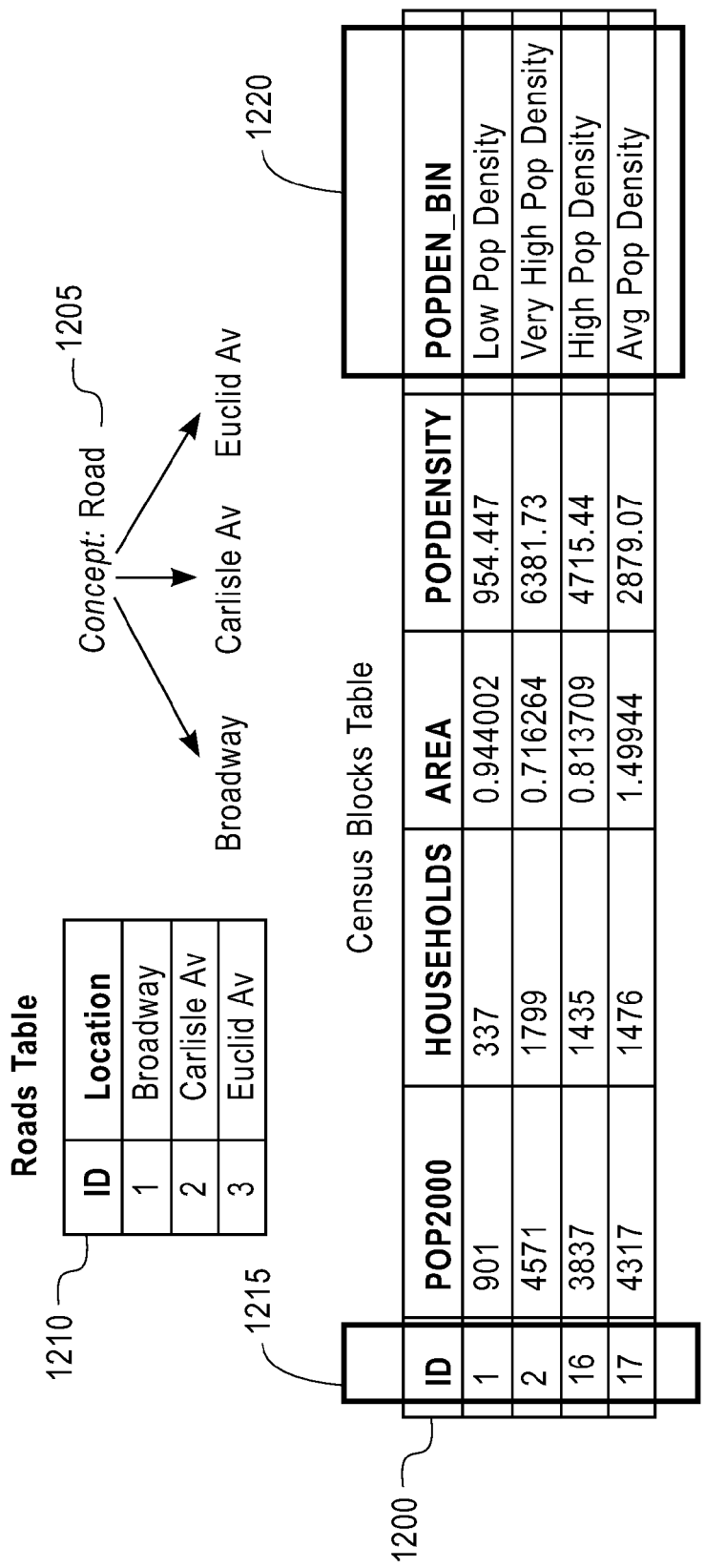
FIG. 12 illustrates exemplary non-spatial information of task-relevant spatial objects in one embodiment.

FIG. 12 illustrates an exemplary table 1200 that associates task-relevant objects and their non-spatial information in one embodiment. In this exemplary embodiment, census information/data blocks 1215 are task-relevant objects. Population density information 1220 of each census information/data block is non-spatial information associated with the census information/data blocks 1215. An exemplary table 1210 lists roads, which are also task-relevant objects. An exemplary taxonomy 1205 represents a concept hierarchical classification of the roads listed in the exemplary table 1210 in a data structure, e.g., tree data structure.

Figure 5:
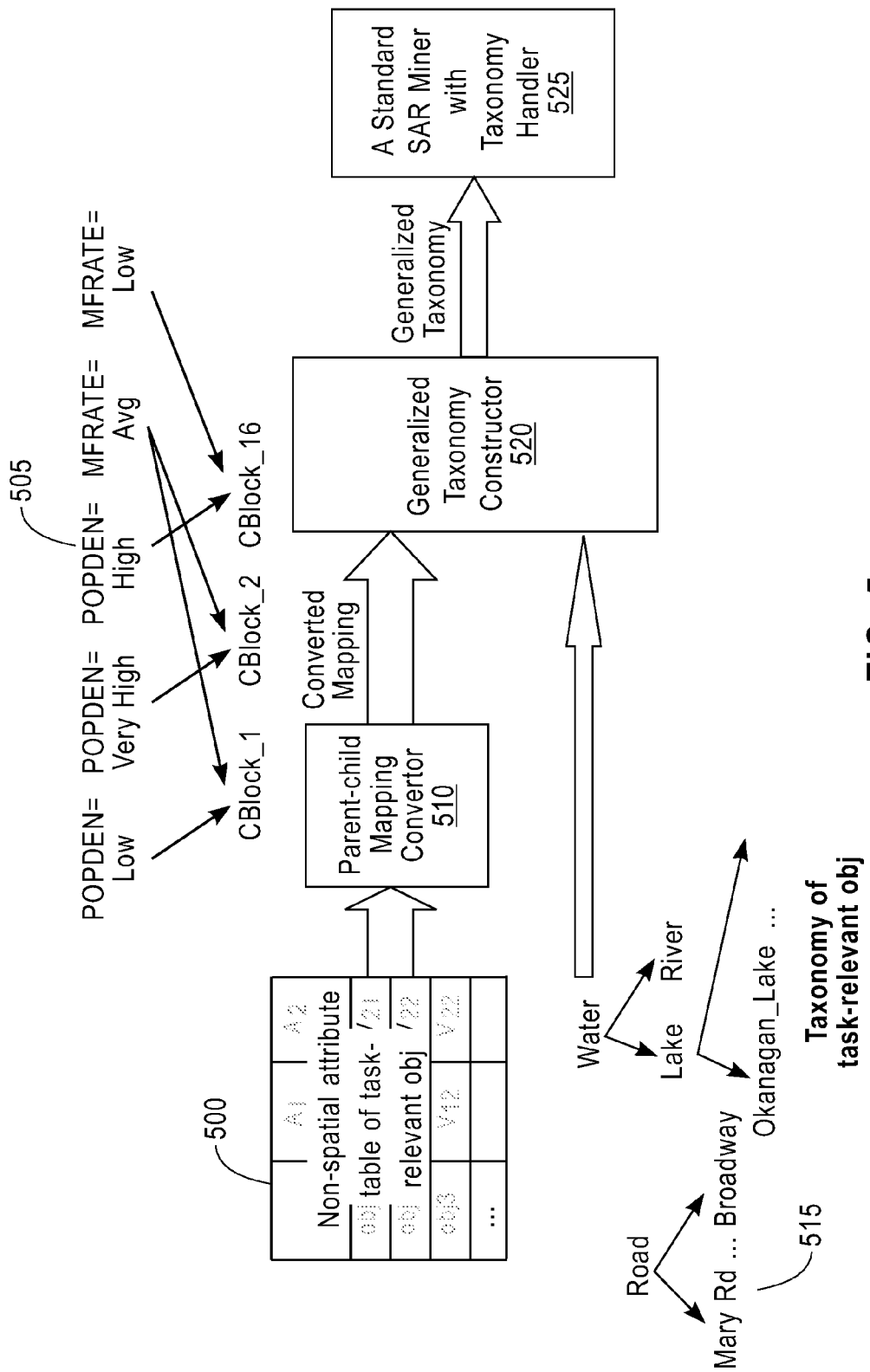
FIG. 5 illustrates a process of creating generalized spatial association rules in one embodiment.

Then, the computing system generates, from the table (e.g., table 500 in FIGS. 5-6 or table 1200 in FIG. 12), a mapping (e.g., a mapping 505 in FIGS. 5-6) that corresponds the task-relevant objects to the non-spatial information associated with the task-relevant objects, e.g., by using a parent-child mapping convertor 510 in FIGS. 5 and 8. The parent-child mapping convertor 510 represents contents of the table 500 as a data structure (e.g., pointer, linked list, etc.). In one embodiment, the parent-child mapping convertor 510 matches each piece of the non-spatial information (e.g., low population density) to a task-relevant object (e.g., a particular block in a town), e.g., by using a pointer data structure.

Figure 14:
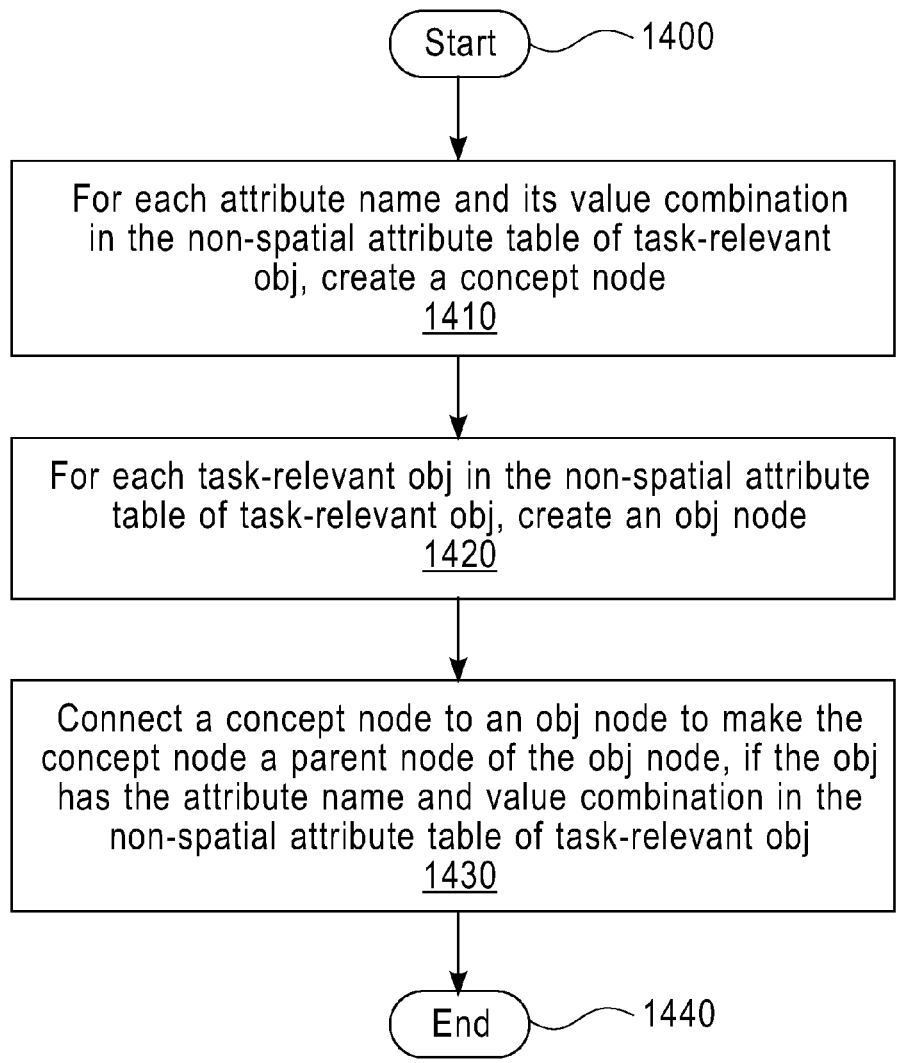
FIG. 14 illustrates a flow chart that describes method steps run by a parent-child mapping convertor in one embodiment.
Figure 15:
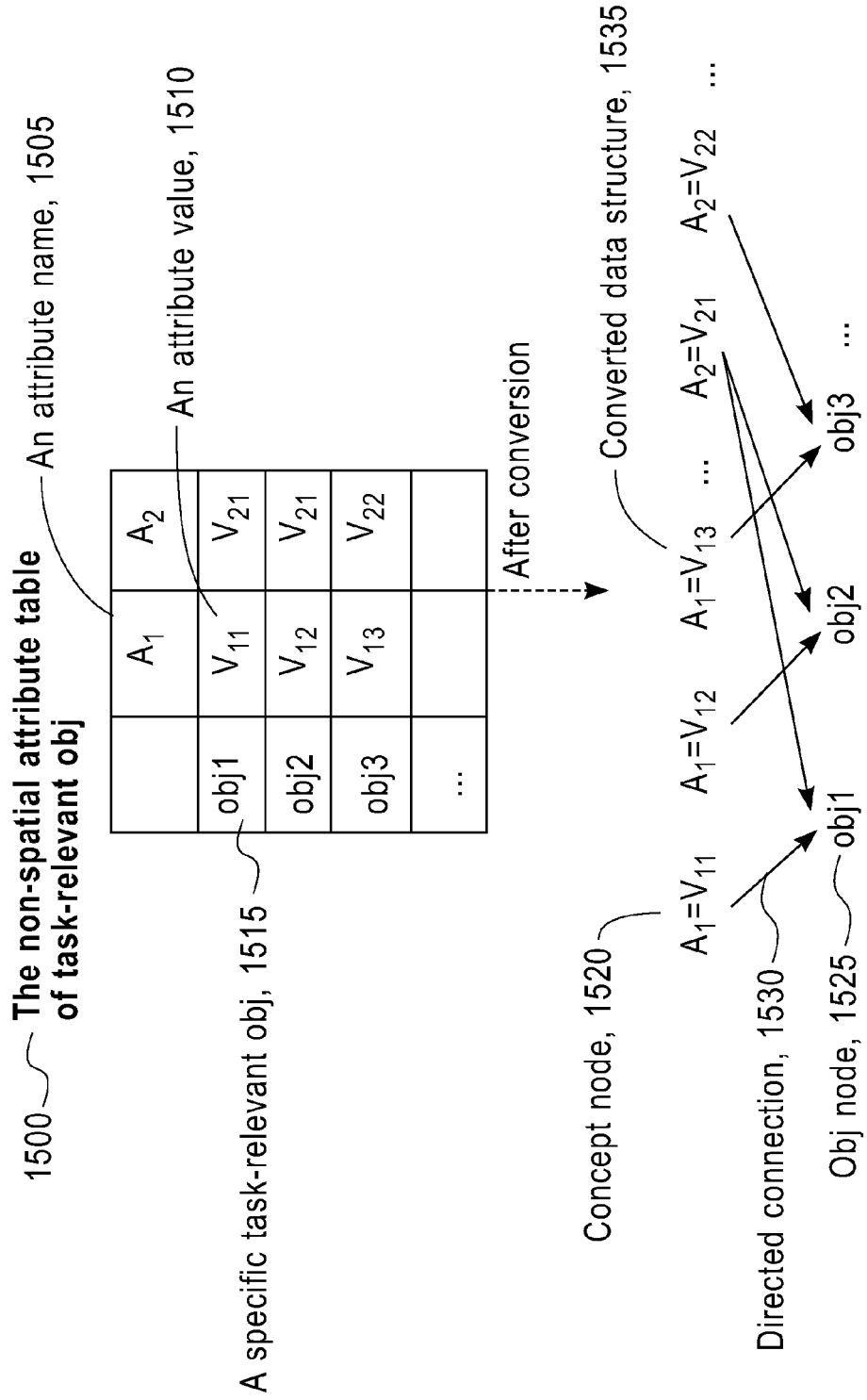
FIG. 15 illustrates an exemplary process run by the parent-child mapping convertor in one embodiment.

FIG. 14 illustrates a flow chart that describes method steps run by the parent-child mapping convertor 510 in one embodiment. FIG. 15 illustrates an exemplary process by the parent-child mapping convertor 510 in one embodiment. The parent-child mapping convertor 510 creates or reads, from a database (e.g., a database 817 shown in FIG. 8), a table 1500 shown in FIG. 15 whose first row includes non-spatial attributes (non-spatial information), e.g., a non-spatial attribute "$A_1$," 1505, and whose first column includes task-relevant spatial objects, e.g., a task-relevant spatial object "obj1" 1515. Table 1500 includes values (e.g., value "$V_{11}$" 1510) of the non-spatial attributes of corresponding task-relevant spatial objects. At step 1400 in FIG. 14, the computing system invokes the parent-child mapping convertor 510 to create a data structure 1535 that associates the task-relevant objects with the non-spatial attributes. At step 1410 in FIG. 14, the parent-child mapping convertor 510 creates at least one concept node (e.g., a concept node "$A_1=V_{11}$" 1520) from the table 1500. A concept node represents a possible combination of a non-spatial attribute and its value. The parent-child mapping convertor 510 creates a concept node per a combination of a non-spatial attribute and corresponding value of that non-spatial attribute.

At step 1420 in FIG. 14, the parent-child mapping convertor 510 creates, e.g., from the table 1500 shown in FIG. 15, at least one object node (e.g., an object node "obj1" 1525 shown in FIG. 15). An object node corresponds to a task-relevant spatial object. The parent-child mapping convertor 510 creates an object node per a task-relevant spatial object. At step 1430 in FIG. 14, the parent-child mapping convertor 510 connects a concept node to an object node, e.g., by making that concept node a parent node of that object node, if that object node has the combination represented by that concept node in the table. For example, as shown in the table 1500 in FIG. 15, an object node "obj1" 1525 has a value "$V_{11}$" 1510 regarding a non-spatial attribute "$A_1$" 1505. Thus, the parent-child mapping convertor 510 creates a concept node "$A_1=V_{11}$" 1520 that associates the value "$V_{11}$" 1510 with the non-spatial attributes "$A_1$" 1505. The parent-child mapping convertor 510 connects the concept node "$A_1=V_{11}$" 1520 to the object node "obj1" 1525, e.g., by making the concept node "$A_1=V_{11}$" 1520 a parent node of the object node "obj1" 1525. By connecting the concept nodes to corresponding object nodes, the parent-child mapping convertor 510 generates a mapping 1535 (i.e., connections) between the concept nodes and the corresponding object nodes. The mapping 1535 is represented by a data structure (e.g., pointer, linked list, etc.). At step 1440 in FIG. 14, the computing system completes the operation of the parent-child mapping convertor 510.

Figure 6:
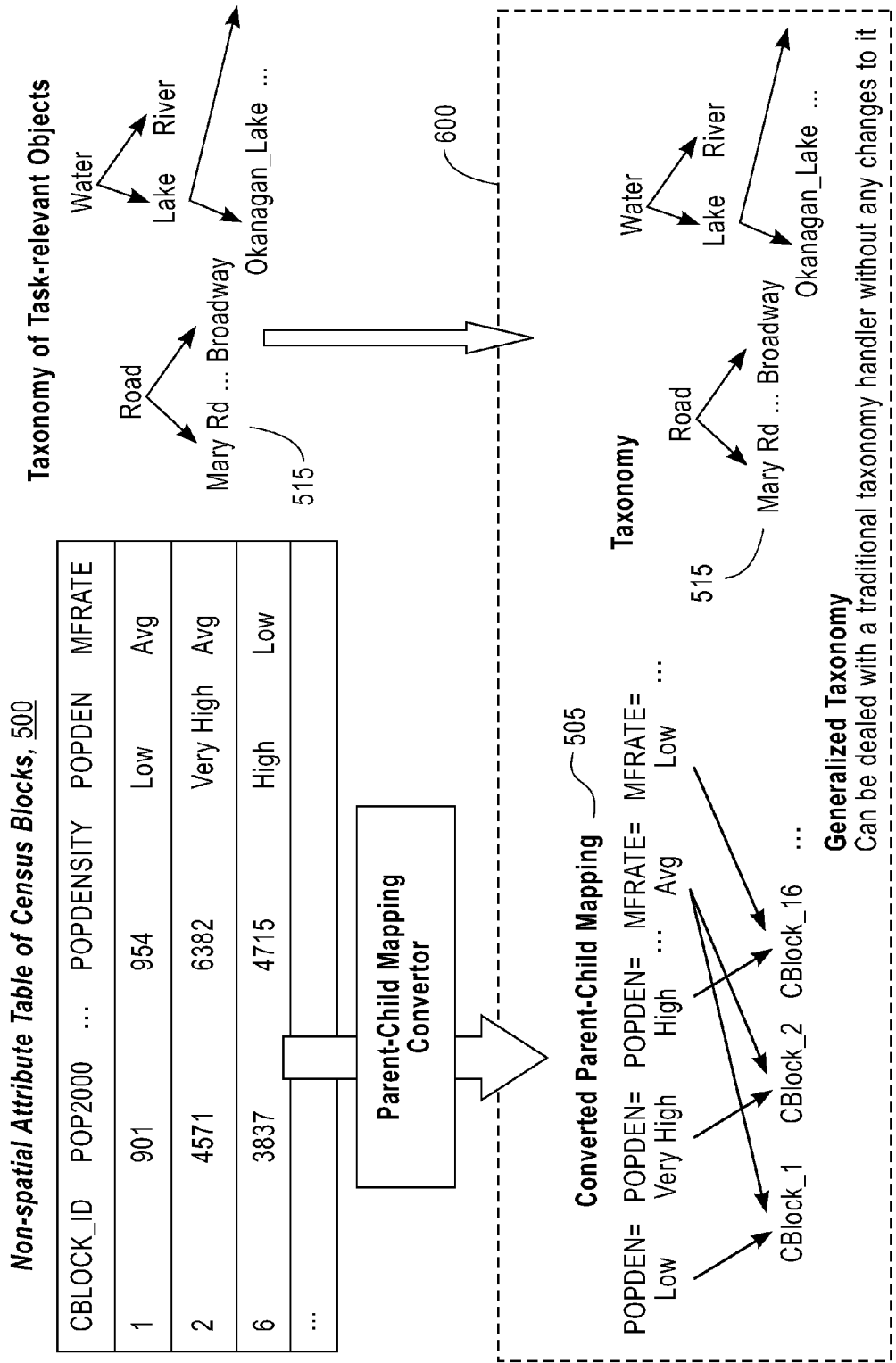
FIG. 6 illustrates an exemplary generalized taxonomy in one embodiment.

Returning to FIG. 7, at step 735, the computing system evaluates whether the task-relevant objects can be classified or whether a taxonomy (i.e., concept classification) of the task-relevant objects is available in a database 825 as shown in an exemplary concept hierarchical classification 515 in FIGS. 5-6 and shown in an exemplary concept hierarchical classification 1205 in FIG. 12. If the task-relevant objects can be classified or the taxonomy (i.e., concept classification) of the task-relevant object is available, at step 740, the computing system represents the taxonomy of the task-relevant spatial objects as a hierarchical data structure (e.g., a tree, heap, etc.) which is compatible or same with a data structure of the mapping (e.g., the mapping 505 in FIG. 6 or data structure 1535 in FIG. 15). Otherwise, the computing system runs step 745 to construct the generalized taxonomy. The taxonomy of the task-relevant spatial objects represents a membership relationship between the task-relevant spatial objects and a concept of the task-relevant spatial objects. The concept refers to a general class or taxonomy of the task-relevant spatial objects or other concepts. The task-relevant spatial objects are specific objects belonging to the concept. The concept is an abstract term of the task-relevant spatial objects. For example, as shown in an exemplary concept hierarchical classification 515 in FIG. 6, if a task-relevant object is "Okanagan_Lake", the "Okanagan_Lake" is represented as a leaf node in a tree. A parent node of the "Okanagan_Lake" node may be a "Lake" node. A root node of the tree may be "Water" node, which represents a general class (i.e., concept) of the "Okanagan_Lake."

Returning to FIG. 7, at step 745, the computing system constructs a generalized taxonomy (e.g., a generalized taxonomy 600 shown in FIG. 6) for the specified task-relevant spatial objects, e.g., by using a generalized taxonomy constructor (e.g., a generalized taxonomy constructor 520 in FIGS. 5 and 8). In one embodiment, the generalized taxonomy constructor 520 constructs the generalized taxonomy 600 for the specified task-relevant objects, as shown in FIG. 6, e.g., by including the mapping 505 between the specified task-relevant objects and the non-spatial information associated the specified task-relevant objects, and the taxonomy 515 of the specified task-relevant objects. The generalized taxonomy of the specified task-relevant objects includes both the non-spatial information of the specified task-relevant objects and the taxonomy associated with the specified task-relevant objects. The generalized taxonomy is represented by a same or compatible data structure (e.g., pointer, linked list, etc.) that a standard association rule miner with taxonomy handler (e.g., a standard SAR miner with taxonomy handler 525 in FIG. 5 and FIG. 8) can read and process.

Figure 16:
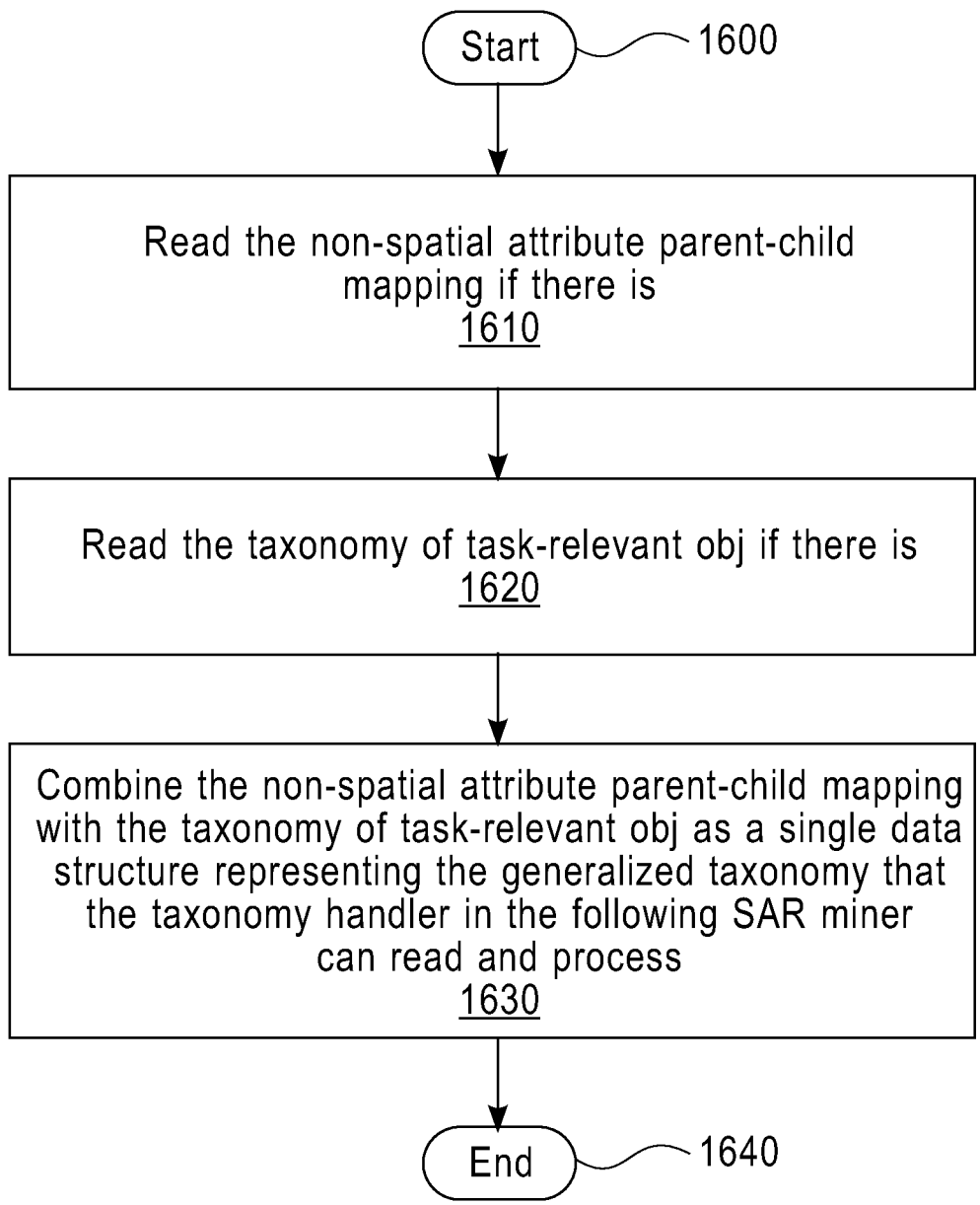
FIG. 16 illustrates a flow chart that describes method steps run by a generalized taxonomy constructor in one embodiment.

FIG. 16 illustrates a flow chart that describes method steps run by the generalized taxonomy constructor 520 in one embodiment. At step 1600, the computing system invokes the generalized taxonomy constructor 520. At step 1610, the generalized taxonomy constructor 520 receives, as an input, the mapping (e.g., mapping 505 shown in FIGS. 5-6 or data structure 1535 shown in FIG. 15 representing the mapping) between the specified task-relevant objects and the non-spatial information associated the specified task-relevant objects, if the mapping 505 is available from the parent-child mapping convertor 510. At step 1620 in FIG. 16, the generalized taxonomy constructor 520 receives, as an input, the taxonomy (e.g., taxonomy 515 shown in FIG. 5) for the specified task-relevant objects, if the taxonomy is available. At step 1630 in FIG. 16, the generalized taxonomy constructor 520 combines the mapping and the taxonomy as a single data structure that represents the generalized taxonomy (e.g., a generalized taxonomy 600 shown in FIG. 6) that the standard SAR miner with a taxonomy handler (e.g., Srikant, Han, etc.) can read and process. The standard SAR miner with the taxonomy handler requires only knowing from the taxonomy that given two nodes, one node is a parent node of the other node. The data structure of the generalized taxonomy is a same or compatible data structure of a traditional taxonomy so that the standard SAR miner with the taxonomy handler needs no modification to read and process the generalized taxonomy. At step 1640 in FIG. 16, the computing system completes the operation of the generalized taxonomy constructor 520.

Figure 1:
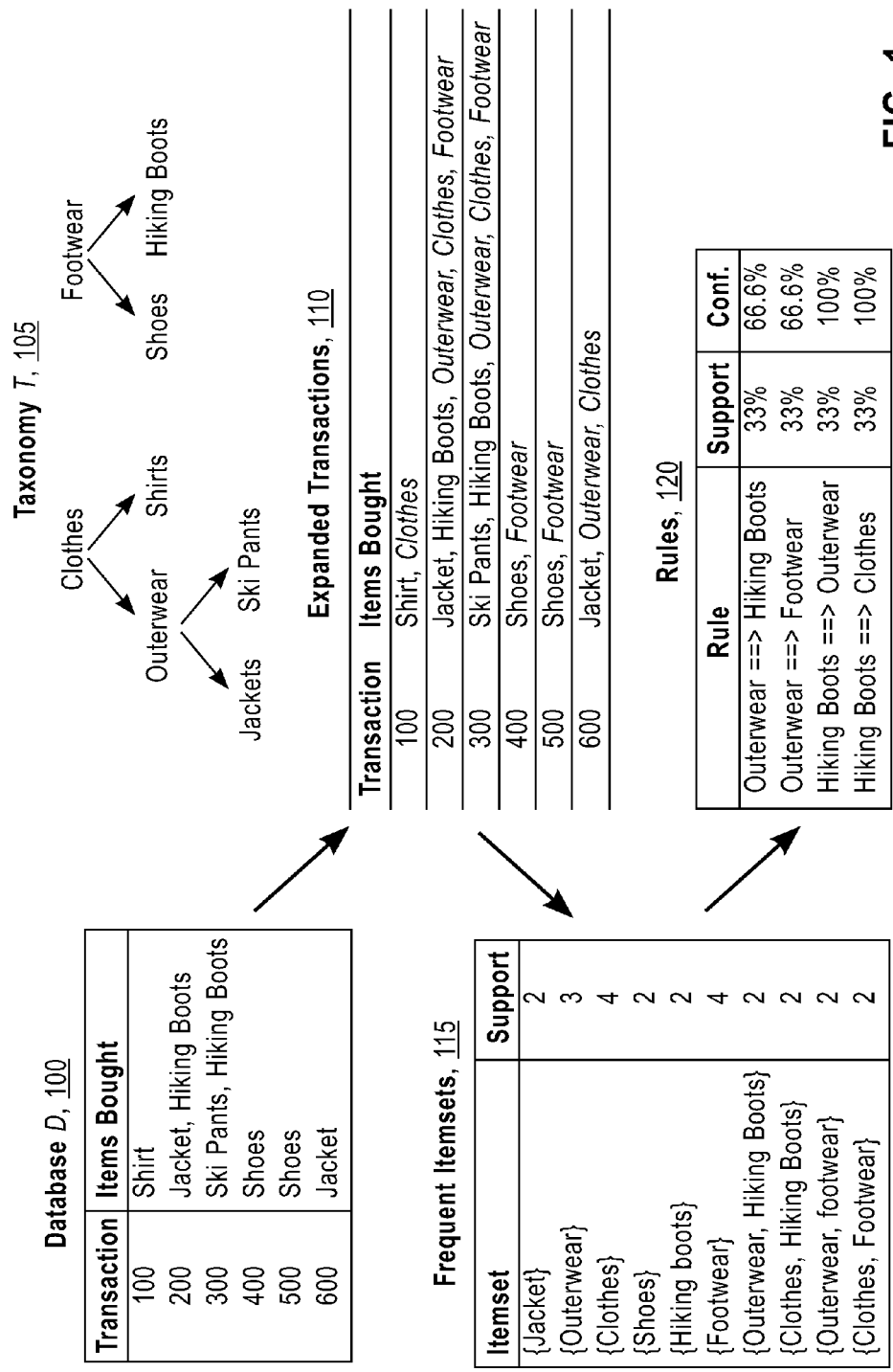
FIG. 1 illustrates exemplary rule creations in a traditional rule miner with a taxonomy handler.
Figure 3:
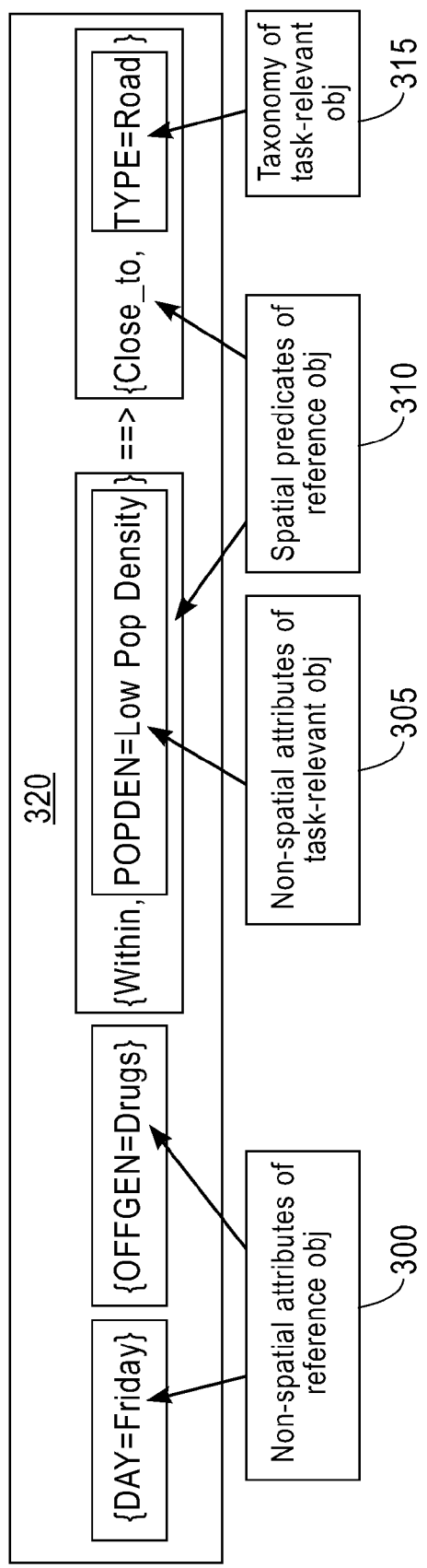
FIG. 3 illustrates exemplary generalized spatial association rule in one embodiment.

The computing system runs the SAR mining tool with a taxonomy handler 525 in FIGS. 5 and 8 (e.g., Koperski, Han, etc.) with the constructed expanded spatial predicate transaction table and the generalized taxonomy. Since the constructed expanded spatial prediction table is represented as a standard data structure (e.g., table, linked list, etc.) and the generalized taxonomy is represented as another standard data structure (e.g., a pointer, linked list, etc.), a standard SAR mining tool with a taxonomy handler can run the constructed expanded spatial predicate transaction table and the generalized taxonomy without modifying the standard SAR mining tool. Returning to step 750 in FIG. 7, the computing system generates, by the running the SAR mining tool 525 with the constructed expanded spatial predicate transaction table and the generalized taxonomy, a set of generalized spatial association rules (e.g., GSAR 840 in FIG. 8) for the reference spatial objects. The set of generalized spatial association rules includes the spatial information and non-spatial information, associated with both the specified reference spatial objects and the specified task-relevant spatial objects. In one embodiment, as shown in FIG. 3, a generalized spatial association rule 320 includes at least one spatial predicate 310 of the specified reference spatial objects, the non-spatial information 300-305 associated with the reference spatial objects and the task-relevant spatial objects, and the concept hierarchical classification (taxonomy) 315 of the task-relevant objects. The generalized spatial association rule represents associations and correlations among the spatial predicates of the specified reference spatial objects and the non-spatial information of all the reference spatial objects and task-relevant spatial objects.

FIG. 10 illustrates three examples of generalized spatial association rules generated according to processing described herein in one exemplary embodiment. These exemplary generalized spatial association rules satisfy that the minimum support value is 10% and that the minimum confidence value is 80%. The first rule 1000 describes that 31% of all crimes were drug crimes that occurred near a road(s) and further describes that 80.8% of all drug crimes were near the road(s). The second rule 1005 describes that 13% of all crimes cases were vehicle thefts that occurred on Saturday within a block(s) that has a low population density (e.g., population is less than 10,000). Among all crime cases that happened on Saturday and within the block(s) that had a low population density, 82.2% were vehicle theft crimes. The third rule 1010 describes that 11% of all crime cases were vehicle thefts that occurred close to a road(s) within a particular block #18. Among all crime cases that happened close to the road(s) within a particular block #18, 81.8% were vehicle theft crimes.

The SAR mining tool 525 in FIG. 5 receives the expanded spatial predicate transaction table of the specified reference spatial objects and the generalized taxonomy that includes taxonomy and non-spatial information of the specified task-relevant objects. Then, the SAR mining tool 525 outputs generalized spatial association rules that also includes the spatial information and non-spatial information of the specified reference spatial objects and the specified task-relevant objects. To process the generalized taxonomy, no change is made in the SAR mining tool 525, which supports reading a traditional taxonomy. Returning to FIG. 7, at step 755, the computing system completes the rule mining described in FIG. 7.

Figure 9:
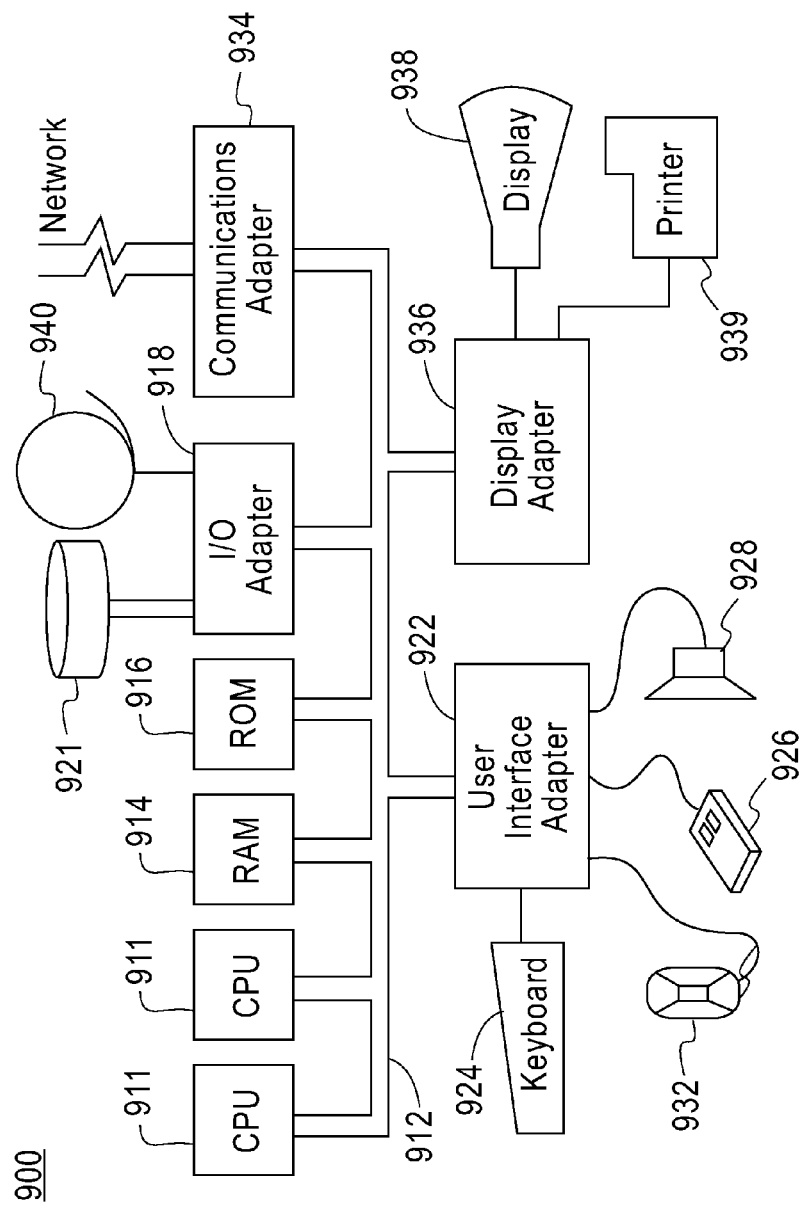
FIG. 9 illustrates exemplary hardware configuration to run the method steps illustrated in FIG. 7 in one embodiment.

FIG. 9 illustrates an exemplary hardware configuration of the computing system 900 that runs the method steps described in FIG. 7. The hardware configuration preferably has at least one processor or central processing unit (CPU) 911. The CPUs 911 are interconnected via a system bus 912 to a random access memory (RAM) 914, read-only memory (ROM) 916, input/output (I/O) adapter 918 (for connecting peripheral devices such as disk units 921 and tape drives 940 to the bus 912), user interface adapter 922 (for connecting a keyboard 924, mouse 926, speaker 928, microphone 932, and/or other user interface device to the bus 912), a communication adapter 934 for connecting the system 900 to a data processing network, the Internet, an Intranet, a local area network (LAN), etc., and a display adapter 936 for connecting the bus 912 to a display device 938 and/or printer 939 (e.g., a digital printer of the like).

In an alternative embodiment, as illustrated in FIG. 13, the computing system adds the non-spatial information 1305 of the specified task-relevant objects to an expanded spatial predicate transaction table 1300. In this alternative embodiment, to add the non-spatial information 1305 of the specified task-relevant objects to the table 1300, a user may modify an interface of the SAR mining tool (e.g., SAR mining tool 525 shown FIGS. 5 and 8) to make the SAR mining tool support an ability to read additional input data which reflects a linkage between the non-spatial information 1305 of the specified task-relevant objects and the specified reference spatial objects. In this alternative embodiment, the user may also modify a core component of the SAR mining tool to add additional procedures that utilize the linkage and prevent generating problematic rules.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for mining a rule including spatial information and non-spatial information by using a SAR (Spatial Association Rule) mining tool, the method comprising:
   constructing, by using a computing system including at least one memory device and at least one processor connected to the memory device, an expanded spatial predicate transaction table for reference spatial objects and a generalized taxonomy for task-relevant spatial objects, the expanded spatial predicate transaction table including both spatial predicates of the reference spatial objects and non-spatial information associated with the reference spatial objects, the generalized taxonomy including: non-spatial information associated with the task-relevant spatial objects, a concept classification of the task-relevant spatial objects, and a mapping between the task-relevant spatial objects and non-spatial attributes representing the non-spatial information associated with the task-relevant spatial objects, the constructing the generalized taxonomy including:
      creating or reading a table that corresponds the task-relevant spatial objects to the non-spatial attributes associated with the task-relevant objects, the table further including values of the non-spatial attributes of the corresponding task-relevant spatial objects; and
      creating the concept classification of the task-relevant spatial objects as a data structure, the creating the concept classification including:
         creating at least one concept node from the table, a concept node representing a combination of a non-spatial attribute and a corresponding value;
         creating at least one object node that corresponds to the task-relevant spatial objects; and
         connecting the at least one concept node to the at least one object node by making a concept node a parent node of an object node;
   running, by using the computing system, the SAR mining tool with the constructed expanded spatial predicate transaction table and the generalized taxonomy;
   generating, by the SAR mining tool, one or more generalized spatial association rules for the reference spatial objects, the one or more generalized spatial association rules having a support value above a first threshold, the one or more generalized spatial association rules having a confidence value above a second threshold, the support value indicating a percentage of occurrences of the individual reference spatial objects, the confidence value indicating a minimum percentage of transactions that involve the individual reference spatial objects, the one or more generalized spatial association rules including the spatial information and non-spatial information, associated with both the reference spatial objects and the task-relevant spatial objects.

2. The method according to claim 1, wherein the concept classification of the task-relevant spatial objects represents a membership relationship between the task-relevant spatial objects and a general class of the task-relevant spatial objects, the task-relevant spatial objects being specific objects belonging to the general class, the general class being a concept abstraction of the task-relevant spatial objects.

3. The method according to claim 2, wherein the generalized spatial association rule includes at least one spatial predicate of the reference spatial objects, the non-spatial information of the reference spatial objects and the task-relevant spatial objects, and the concept classification of the task-relevant spatial objects.

4. The method according to claim 3, wherein the at least one spatial predicate of a reference spatial object includes: (a) a task-relevant spatial object or a concept of the task-relevant spatial objects; and (b) at least one spatial relationship between the reference spatial object and the task-relevant spatial object or at least one spatial relationship between the reference spatial object and the concept of task-relevant spatial objects.

5. The method according to claim 4, wherein the at least one spatial relationship includes one or more of: a topological relationship, a metrical relationship, and a directional relationship, the topological relationship including one of: an intersection, an adjacency, and an inclusion, the metrical relationship including one of: a distance, an area, and a closeness, the directional relationship including one of: above, behind, north, west, east, south, northeast, southwest, northwest, and southeast.

6. The method according to claim 3, wherein the non-spatial information of the reference spatial objects and the task-relevant spatial objects includes one or more of: demographic information, temporal or seasonal information, event information, accident information, financial information, disease information, and crime information.

7. The method according to claim 2, wherein the generalized spatial association rule represents associations and correlations among the spatial predicates of the reference spatial objects and the non-spatial information of all the reference and task-relevant spatial objects.

8. The method according to claim 1, wherein the SAR mining tool supports running the constructed generalized taxonomy.

9. A system for mining a rule including spatial information and non-spatial information by using a SAR (Spatial Association Rule) mining tool, the system comprising:
  a computing system including at least one memory device and at least one processor connected to the memory device,
  wherein the computing system is configured to:
  construct an expanded spatial predicate transaction table for reference spatial objects and a generalized taxonomy for task-relevant spatial objects, the expanded spatial predicate transaction table including both spatial predicates of the reference spatial objects and non-spatial information associated with the reference spatial objects, the generalized taxonomy including: non-spatial information associated with the task-relevant spatial objects, a concept classification of the task-relevant spatial objects, and a mapping between the task-relevant spatial objects and non-spatial attributes representing the non-spatial information associated with the task-relevant spatial objects, the construct the generalized taxonomy including:
    create or read a table that that corresponds the task-relevant spatial objects to the non-spatial attributes associated with the task-relevant objects, the table further including values of the non-spatial attributes of the corresponding task-relevant spatial objects; and
    create the concept classification of the task-relevant spatial objects as a data structure, the create the concept classification including:
      create at least one concept node from the table, a concept node representing a combination of a non-spatial attribute and a corresponding value;
      create at least one object node that corresponds to the task-relevant spatial objects; and
      connect the at least one concept node to the at least one object node by making a concept node a parent node of an object node;
  run the SAR mining tool with the constructed expanded spatial predicate transaction table and the generalized taxonomy;
  generate, by the SAR mining tool, one or more generalized spatial association rules for the reference spatial objects, the one or more generalized spatial association rules having a support value above a first threshold, the one or more generalized spatial association rules having a confidence value above a second threshold, the support value indicating a percentage of occurrences of the individual reference spatial objects, the confidence value indicating a minimum percentage of transactions that involve the individual reference spatial objects, the one or more generalized spatial association rules including the spatial information and non-spatial information, associated with both the reference spatial objects and the task-relevant spatial objects.

10. The system according to claim 9, wherein the concept classification of the task-relevant spatial objects represents a membership relationship between the task-relevant spatial objects and a general class of the task-relevant spatial objects, the task-relevant spatial objects being specific objects belonging to the general class, the general class being an abstraction of the task-relevant spatial objects.

11. The system according to claim 10, wherein the generalized spatial association rule includes at least one spatial predicate of the reference spatial objects, the non-spatial information of the reference spatial objects and the task-relevant spatial objects, and the concept classification of the task-relevant spatial objects.

12. The system according to claim 11, wherein the at least one spatial predicate of a reference spatial object includes: (a) a task-relevant spatial object or a concept of the task-relevant spatial objects; and (b) at least one spatial relationship between the reference spatial object and the task-relevant spatial object or at least one spatial relationship between the reference spatial object and the concept of task-relevant spatial objects.

13. The system according to claim 12, wherein the at least one spatial relationship includes one or more of: a topological relationship, a metrical relationship, and a directional relationship, the topological relationship including one of: an intersection, an adjacency, and an inclusion, the metrical relationship including one of: a distance, an area, and a closeness, the directional relationship including one of: above, behind, north, west, east, south, northeast, southwest, northwest, and southeast.

14. The system according to claim 11, wherein the non-spatial information of the reference spatial objects and the task-relevant spatial objects includes one or more of: demographic information, temporal or seasonal information, event information, accident information, financial information, disease information, and crime information.

15. The system according to claim 10, wherein the generalized spatial association rule represents associations and correlations among the spatial predicates of the reference spatial objects and the non-spatial information of all the reference and task-relevant spatial objects.

16. The system according to claim 9, wherein the SAR mining tool supports running the constructed generalized taxonomy.

17. A computer program product for mining a rule including spatial information and non-spatial information by using a SAR (Spatial Association Rule) mining tool, the computer program product comprising a non-transitory storage device readable by a processing circuit and storing instructions run by the processing circuit for performing a method, the method comprising:
  constructing, by using the processing circuit, an expanded spatial predicate transaction table for reference spatial objects and a generalized taxonomy for task-relevant spatial objects, the expanded spatial predicate transaction table including both spatial predicates of the reference spatial objects and non-spatial information associated with the reference spatial objects, the generalized taxonomy including non-spatial information associated with the task-relevant spatial objects, a concept classification of the task-relevant spatial objects, and a mapping between the task-relevant spatial objects and non-spatial attributes representing the non-spatial information associated with the task-relevant spatial objects, the constructing the generalized taxonomy including:
    creating or reading a table that corresponds the task-relevant spatial objects to the non-spatial attributes associated with the task-relevant objects, the table further including values of the non-spatial attributes of the corresponding task-relevant spatial objects; and
    creating the concept classification of the task-relevant spatial objects as a data structure, the creating the concept classification including:
      creating at least one concept node from the table, a concept node representing a combination of a non-spatial attribute and a corresponding value;
      creating at least one object node that corresponds to the task-relevant spatial objects; and connecting the at least one concept node to the at least one object node by making a concept node a parent node of an object node;

running, by using the processing circuit, the SAR mining tool with the constructed expanded spatial predicate transaction table and the generalized taxonomy;

generating, by the SAR mining tool, one or more generalized spatial association rules for the reference spatial objects, the one or more generalized spatial association rules having a support value above a first threshold, the one or more generalized spatial association rules having a confidence value above a second threshold, the support value indicating a percentage of occurrences of the reference spatial objects, the confidence value indicating a minimum percentage of transactions that involve the reference spatial objects, the one or more generalized spatial association rules including the spatial information and non-spatial information, associated with both the reference spatial objects and the task-relevant spatial objects.

18. The computer program product according to claim 17, wherein the generalized taxonomy for the task-relevant spatial objects further includes: a concept classification of the task-relevant spatial objects, and a mapping between the task-relevant spatial objects and non-spatial attributes representing the non-spatial information associated with the task-relevant spatial objects.

* * * * *